United States Patent [19]

Hester

[11] 4,152,904
[45] May 8, 1979

[54] ABSORPTION HEATING-COOLING SYSTEM

[75] Inventor: Jarrett C. Hester, Clemson, S.C.

[73] Assignee: Clemson University, Clemson, S.C.

[21] Appl. No.: 839,763

[22] Filed: Oct. 6, 1977

Related U.S. Application Data

[62] Division of Ser. No. 703,836, Jul. 9, 1976, Pat. No. 4,062,197.

[51] Int. Cl.² ..................... F25B 15/00; F25B 33/00
[52] U.S. Cl. .................................... 62/476; 62/495
[58] Field of Search ............. 62/101, 109, 476, 477, 62/495, 496

[56] References Cited

U.S. PATENT DOCUMENTS

| | | | |
|---|---|---|---|
| 2,802,344 | 8/1957 | Witherell | 62/101 |
| 2,904,969 | 9/1959 | Reamer | 62/477 |
| 3,320,760 | 5/1967 | Swearingen | 62/476 |
| 3,358,465 | 12/1967 | Russell | 62/101 |
| 3,621,665 | 11/1971 | Mokadam | 62/79 |

*Primary Examiner*—Lloyd L. King
*Attorney, Agent, or Firm*—Wellington M. Manning, Jr.; Luke J. Wilburn, Jr.

[57] ABSTRACT

An improved heating or cooling system based on absorption principles is disclosed and claimed herein. A closed system is provided with a refrigerant-absorbent solution where separation of the refrigerant-absorbent is accomplished by a semi-permeable membrane. The refrigerant-absorbent solution at its normal concentration is pumped under pressure to a membrane separation unit where the refrigerant is selectively passed through a membrane separator in some proportion while a remaining absorbent enriched refrigerant-absorbent solution is rejected. The membrane separated refrigerant is then circulated through a heat exchange leg of the system for heating and/or cooling of affected areas depending upon the particular treatment of the refrigerant. At the end of the heat exchange leg, the refrigerant is fed to an absorber where it is recombined with the absorbent enriched solution to reconstitute the original refrigerant-absorbent solution which is then recirculated by the pump and the cycle is repeated. The apparatus and process of heat transfer systems utilizing the present membrane separation are claimed.

15 Claims, 2 Drawing Figures

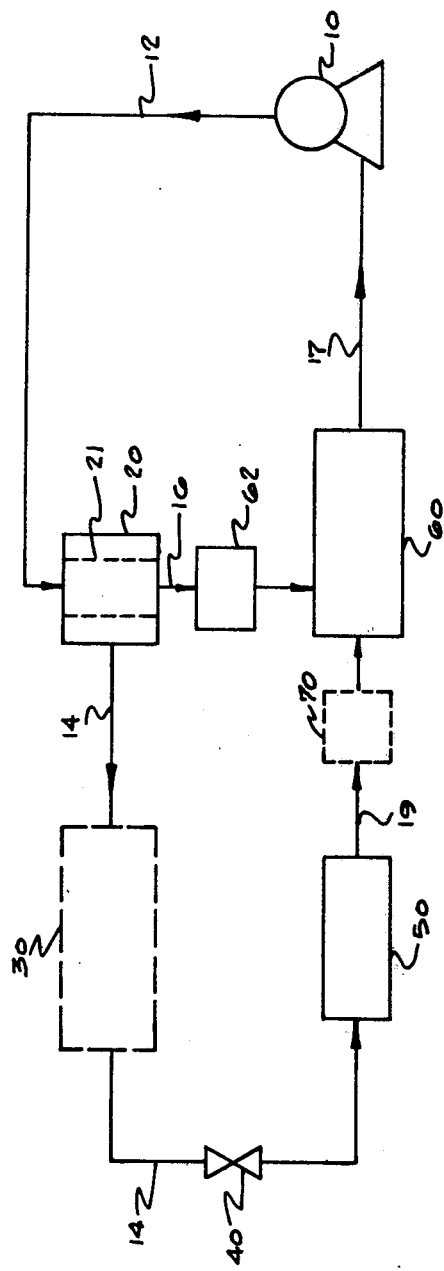
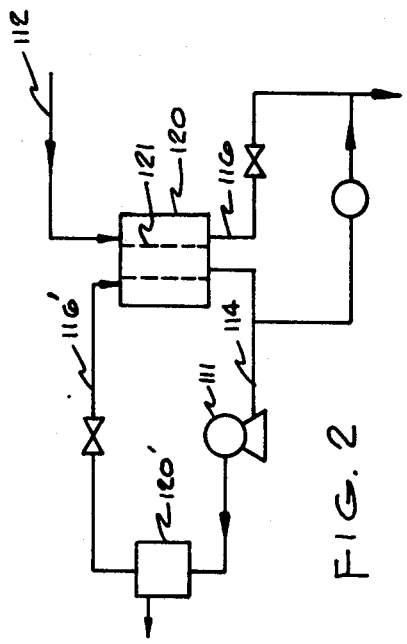

ABSORPTION HEATING-COOLING SYSTEM

CROSS REFERENCE TO RELATED APPLICATION

This application is a division of copending application Ser. No. 703,836, filed July 9, 1976, and entitled "Improved Absorption Heating-Cooling System", now U.S. Pat. No. 4,062,197.

BACKGROUND OF THE INVENTION

Absorption refrigeration and heating systems are well established in the art. A refrigerant-absorbent solution is normally circulated to an evaporator where the refrigerant is vaporized leaving a residual absorbent enriched solution. The refrigerant vapors are then transferred throughout the remainder of the process where they are condensed and thereafter again evaporated to effect heat transfer in designated areas. The absorbent enriched solution and refrigerant are thereafter recombined in an absorber where refrigerant vapor is absorbed by the absorbent solution to reconstitute the solution to its preseparation concentration. The reconstituted solution is then recycled to the evaporator separator for continued operation.

Such absorption heat transfer systems have heretofore been improved without making changes to the general concept of same. Improvements, instead, have generally been made to the refrigerant-absorbent system by particular selection of the components that make up the solution and by the addition of one or more additional components to improve the separability of the refrigerant from the solution. Additionally, other improvements have been made to the standard equipment and/or particular utilization of same to effect an efficiency improvement for the conventional absorption heat transfer processs. In all of these prior systems, however, the general separative techniques for segregating the refrigerant from the normal refrigerant-absorbent solution has been evaporation which, of course, requires an input of substantial heat energy to effect the separation.

The present invention represents a deviation from the conventional absorption system, primarily in the technique for separating the refrigerant from the refrigerant-absorption solution. Such change involves technology that requires substantially less energy input to effect the separation. Substantial economy and improvement is thus recognized in operation of the present absorption heat transfer system without any appreciable adverse effects thereto.

SUMMARY OF THE INVENTION

It is an object of the present invention to provide an improved heat transfer system of the absorption type.

Another object of the present invention is to provide an improved absorption heating-cooling system.

Yet another object of the present invention is to provide an absorption heating-cooling system where separation of the refrigerant from the refrigerant-absorbent solution is achieved by membrane separation techniques.

Still another object of the present invention is to provide an improved process for heating and/or cooling an area by absorption refrigeration techniques utilizing improved separation methods.

Generally speaking, the improved absorption heating-cooling system of the present invention comprises a membrane separator, said membrane separator being capable of selectively passing a portion of a refrigerant-absorbent solution therethrough; refrigerant heat transfer means operatively associated with said membrane separator to receive refrigerant therefrom and effect a heat transfer for same in an area affected thereby; an absorber operatively associated with said refrigerant heat transfer means and said membrane separator to receive separated refrigerant and rejected absorbent enriched solution thereat, whereby said refrigerant may be absorbed by said absorbent enriched solution to reconstitute said refrigerant-absorbent solution; and refrigerant-absorbent solution pumping means operatively associated with said absorber and said membrane separator for pumping said refrigerant-absorbent solution under pressure to said membrane separator.

More specifically, the use of a membrane separation system for selectively removing refrigerant from the refrigerant-absorbent solution reduces energy input to the system by a substantial amount. There is wide variation in the types of membranes that will effectively separate refrigerant from the refrigerant-absorbent solutions. Such membranes generically fall in a class of neutral organic membranes or hyperfiltration membranes. It should be understood, however, that the particular membrane selected may be engineered to the particular refrigerant-abosrbent solution that is utilized, as to components and as to relative ratios of same in the solution.

Suitable refrigerant-absorbent solutions, like the membrane separators, are represented by a group, sizable in number, that may be employed according to the present invention. In general, however, the solutions utilized should exhibit large negative deviations from Raoult's Law; should exhibit an affinity to absorb a vapor of one constituent into the solution; and should exhibit strong ion-dipole bonds or hydrogen bonding characteristics that are capable of being broken by osmotic pressure for removal of the refrigerant component therefrom.

In the operation of conventional absorption refrigeration systems, a high concentration of absorbent is normally utilized, typically in a range of 50 to 60 percent. While absorbent concentrations in this general range may likewise be employed with a membrane separation unit in the absorption system, high pressures would be necessary upstream of the membrane unit to achieve the desired separation. In the sense of the present invention, however, a high solids concentration may not be needed as with the normal absorption heat transfer system, depending upon absorbent-refrigerant combinations selected. Lessening of the absorbent concentration in the refrigerant-absorbent solution reduces the upstream pressures that must be generated by the pumping means at the membrane separator.

In certain applications, with particular refrigerant-absorbent compositions a single pass through a membrane separator unit may not be sufficient to realize the desired degree of separation. A bank of separator units may thus be employed, utilizing a number of individual units sufficient to segregate the refrigerant from the particular refrigerant-absorbent combination being employed. In such a tandem array of membranes, the same or different membranes may be employed, again depending upon the dictates of the specific refrigerant-absorbent solution being handled.

Downstream of the membrane separation unit, the liberated refrigerant may then be properly treated to effect a heat transfer in a designated area to be affected thereby. For example, the refrigerant, presently in liquid form, may be vaporized in an evaporator as is customary in an absorption refrigeration system to generate a cooling effect on the desired area. Additionally, other apparatus may be spaced throughout the system to implement efficiency or achieve a particular end result. For example, a turbine may be installed in the line connecting the discharge side membrane separator for passage of the rejected absorbent enriched solution from the membrane separator to an absorber unit. Energy produced by the increased pressures in the line could thus be dissipated by operation of the turbine for an extraneous or related purpose. Likewise, a small compressor may be installed prior to the absorber to bring the refrigerant thereat to a proper pressure level for absorption. Still further, various heat exchangers may be added which may or may not involve a phase change, where desired, to improve the overall efficiency of the system, or to supply heating or cooling at desired locations.

BRIEF DESCRIPTION OF THE DRAWINGS

FIG. 1 is a schematic illustration of the improved absorption heating-cooling system of the present invention.

FIG. 2 is a schematic illustration of a further embodiment of the system as illustrated in FIG. 1 showing tandem membrane separators.

DESCRIPTION OF THE PREFERRED EMBODIMENTS

Making reference to the Figures, preferred embodiments of the present invention will now be described in detail. FIG. 1 illustrates the general scheme of the improved absorption heating-cooling system of the present invention. It should be noted that while the present invention is generally described as a heating-cooling system, either heating or cooling alone could be achieved for an intended result. Likewise, the term refrigerant-absorbent solution is intended to generally represent solutions containing a refrigerant and absorbent and optionally one or more additional ingredients that may be utilized in a heat transfer treating operation to achieve the heating and/or cooling effect desired.

As illustrated in FIG. 1, a pump 10 is employed with appropriate process piping 12 to communicate with a membrane seaparator unit 20. Depending upon the particular refrigerant-absorbent combination, increased pressure is required between pump 10 and membrane separator 20 which may range from 200 pounds per square inch absolute to about 20,000 pounds per square inch absolute. The rating of pump 10 may thus vary considerably. Membrane separator unit 20 has a semipermeable membrane 21 located therein which receives the refrigerant-absorbent solution under sufficient pressure such that at least a portion of the refrigerant osmotically passes through the membrane and is thus separated from the refrigerant-absorbent solution. Membrane separator unit 20 has one outlet 14 on the downstream side thereof through which the separated refrigerant is transported, and a second outlet 16 through which the rejected absorbent enriched solution exits the unit.

The particular semi-permeable membrane employed to separate the refrigerant from the refrigerant-absorbent solution is preferably engineered for the combination of refrigerant-absorbent that comprises the treatment solution. In general, suitable membranes should be of a class of neutral organic membranes as exemplified by those prepared from cellulose acetate, sulfurous polyfunctional alcohol resins, and poly(ethylene oxide) with selected side chains, or of a class of hyperfiltration membranes as illustrated by those prepared from hydrous salt oxides of zirconium, tin and iron, and polyelectrolytes such as poly(styrene sulfonate) and poly(acrylic acid).

As further illustrated in FIG. 1, process line 14 connects membrane separator unit 20 to an optional heat transfer unit 30 which may be utilized to reject heat from the liquid refrigerant and thereby heat affected areas. Generally heat transfer unit 30, if employed, is not needed for a phase change in the present process scheme since the refrigerant separated from the refrigerant-absorbent solution is in liquid form. If, however, the enthalpy level of the refrigerant is not sufficiently low to function in the evaporator following a constant enthalpy expansion of the refrigerant, to be more fully discussed hereinafter, heat transfer unit 30 as defined above, would be needed.

Downstream of thermal treatment unit 30 on separator unit 20, if unit 30 is not present, further process line 14 conducts the refrigerant to an expansion valve on device 40 and from expansion valve 40 to an evaporator 50. Expansion valve 40 reduces the refrigerant pressure for more efficient operation of evaporator 50 which vaporizes the refrigerant and thus produces a cooling in the affected area. A further process line 19 then connects evaporator 50 with an absorber unit 60 to supply vaporous refrigerant to absorber 60 where it is absorbed by the absorbent enriched solution that was rejected by separator unit 20. A compressor 70 may be included between evaporator 50 and absorbent 60 to raise the pressure of the refrigerant vapor from that at evaporator 50 to a proper pressure level for passage through absorber 60. Particularly, the refrigerant vapor pressure should be higher at the evaporator temperature than the vapor pressure of the absorbent enriched solution at the absorber temperature to realize the necessary pressure gradient for introduction of the refrigerant vapor into the absorber. For many refrigerant-absorbent solutions this will naturally occur and compressor 70 will not be required.

In absorber 60, the absorbent enriched solution from membrane separator 20 is introduced along with vaporous refrigerant from evaporator 50 and the refrigerant vapors are absorbed by the absorbent solution to reconstitute the original refrigerant-absorbent solution. Subsequent to absorber 60 the reconstituted refrigerant-absorbent solution is transported through process line 17 to pump 10 and the separation, heat transfer, absorption cycle is then repeated. Moreover, heat removal from absorber 60 may be used in the heating mode to heat a desired area with energy supplied from the evaporator 50 and the pump 10.

The energy stored in the absorbent enriched solution at separator unit 20 may be conserved by inclusion of a turbine or the like 62 in process line 16 that connects separator unit 20 and absorber 60. This optional work unit can dissipate the pressure of the rejected absorbent solution and be operated thereby. In the absence of a turbine, an expansion valve or the like will be required to reduce the pressure level of the absorbent enriched solution to a level needed for operation in absorber 60.

Commercial embodiments of the individual units that are employed to make up the present system are well known to those skilled in the art. Hence no particular structural description of any facet of the apparatus will be rendered. It should be pointed out, however, as is illustrated in FIG. 1, that membrane separator unit 20 is illustrative of a membrane with inflow feed into the center of same, whereby the refrigerant will pass through the walls of the semi-permeable membrane and its support while the rejected absorbent solution will pass thereby. The reverse could, however, be employed, in that, the inflow feed to the membrane could be around the outside of the membrane with the refrigerant that is separated passing internally of same and exiting the unit appropriately. Likewise, any other membrane arrangement may be utilized so long as the desired separation is achieved thereat.

FIG. 2 illustrates a portion of the present system to particularly illustrate a tandem membrane separator arrangement. Process line 112 represents initial inflow feed into a first separator unit 120, directing refrigerant-absorbent solution around the outside of a membrane 121 as shown in phantom. Refrigerant passes inwardly of the membrane and to a second pump 111 through line 114. Rejected absorbent solution exits first separator unit 120 through process line 116. Separated refrigerant is then pumped via pump 111 to a second separator unit 120' for a further membrane separation with rejected solution therefrom returning to first separator unit 120 through process line 116' and separated refrigerant continuing through the system as described in FIG. 1 for appropriate heat exchange operations. In such an arrangement, the membrane selected for separator units 120 and 120' may be the same or different.

In selecting a suitable refrigerant-absorbent solution for use in conjunction with the present absorption heating-cooling system, several solution characteristics should result. The solution should exhibit a large negative deviation from Raoult's Law which may be stated as follows:

$$P_3 = P_a x$$

where
$P_a$ = partial pressure of component a over the solution
$P_a$ = vapor pressure of a in a pure state at the temperature of the solution
x = mole fraction represented by a in the solution Raoult's linear relationship applies to an ideal solution which is achieveable only when the components are very similar chemically and there is no interaction between the molecules. With a two component non-ideal system, however, as exemplified by water-lithium bromide, there is a non-linear relationship between the vapor pressure of one of the components and its mole fraction percentage of the solution. Hence, for a suitable solution according to the present invention, the partial vapor pressure of the refrigerant is lowered in the refrigerant-absorbent solution.

A suitable refrigerant-absorbent solution should also possess the capability, in an enriched solution of one of the components, of absorbing vapors of the other component. Reconstitution of the starting refrigerant-absorbent solution is thus achieveable to permit continuous use of same in the closed system. Further, there must be evidence of strong ion-dipole bonds or hydrogen bonding in the solution while the bonds are sufficiently weak to permit a certain degree of separation of the components by osmotic pressure. In fact, the solution should also be capable of osmotic pressures at the determined concentration levels of less than 15,000 pounds per square inch absolute. Without limitation, examples of suitable refrigerant-absorbent combinations, that may appear in various ratios, include water-lithium bromide; water-lithium chloride; water-lithium iodide; water-general glycols, such as triethyleneglycol; dimethoxytetraethylene glycol-dicholormethane; water-ammonia; water-calcium chloride; water-copper sulfate; and water-polyphosphoric acid. Water is a preferred refrigerant for use according to the teachings of the present invention. As mentioned earlier, there may be wide divergence in the particular refrigerant-absorbent combinations that are suitable as with the particular membranes that may be utilized for separation of the refrigerant therefrom. In operation therefore, a particular choice of a semi-permeable membrane is preferably made for the particular refrigerant-absorbent solution at the designated concentration that is selected.

Operation of the present absorption heating-cooling system as described above proceeds as follows. A refrigerant-absorbent solution, e.g., water-lithium bromide is charged into the system which is then sealed. Pump 10 transfers the normal refrigerant-absorbent solution, as charged, at increased pressure conditions to membrane separator unit 20 where semi-permeable membrane, e.g., cellulose acetate 21 is employed. Water refrigerant selectively permeates the cellulose acetate membrane while the lithium bromide and a portion of the water is rejected and exits membrane separator unit 20 as a lithium bromide enriched solution and passes to absorber unit 60 via a work unit or expansion device 62. The separated water refrigerant may then be subjected to condensor 30 if the enthalpy of the refrigerant should be reduced prior to expansion of same.

The water refrigerant is typically in liquid form after passing through the membrane separator and condensor 30. At this point in the system the water is still at a relatively high pressure and is subjected to an expansion valve 40 to reduce the pressure prior to entering evaporator 50 such that a lower temperature is required at evaporator 50 to volatilize the refrigerant. Volatilization of the water refrigerant extracts heat from the ambient area to effect cooling of same. Water vapor generated in evaporator 50 then passes to absorber 60 where it is recombined with the lithium bromide solution. Heat removal from the absorber 60 may be used to heat a desired area. The reconstituted water-lithium bromide solution is then transferred through process line 17 back to pump 10 and the cycle is repeated.

Having described the present invention in detail, it is obvious that one skilled in the art will be able to make variations and modifications thereto without departing from the scope of the invention. Accordingly, the scope of the present invention should be determined only by the claims appended hereto.

What is claimed is:
1. Apparatus for effecting heat transfer in a particular area comprising:
   (a) a pressure differential membrane separator unit, said membrane separator unit being capable of osmotic separation of at least a portion of refrigerant from a refrigerant-absorbent solution while rejecting absorbent, thereby yielding an absorbent enriched solution;
   (b) heat transfer means operatively associated with said membrane separator to receive separated refrigerant therefrom and effect a heat transfer on said refrigerant, whereby a heat exchange is experienced in an area affected thereby;

(c) an absorber operatively associated with said heat transfer means to receive refrigerant therefrom and operatively associated with said membrane separator unit to receive absorbent enriched solution therefrom, whereby said refrigerant is absorbed by said absorbent enriched solution to reconstitute said refrigerant-absorbent solution; and (d) refrigerant-absorbent solution pumping means operatively associated with said absorber and said membrane separator unit for receiving reconstituted refrigerant-absorbent solution from said absorber and pumping same to said membrane separator unit for repeating the heat transfer cycle.

2. The apparatus as defined in claim 1 wherein the membrane separator unit contains a semi-permeable membrane.

3. The apparatus as defined in claim 2 wherein the semi-permeable membrane is selected from a group consisting of neutral organic and hyperfiltration membranes.

4. The apparatus as defined in claim 2 wherein said membrane is arranged to receive refrigerant-absorbent solution internally of same, whereby refrigerant passes through the membrane wall to be separated and the absorbent enriched solution is rejected, and exits the membrane through an end of same.

5. The apparatus as defined in claim 2 wherein the membrane is arranged to receive refrigerant-absorbent solution externally of same, whereby refrigerant passes through the membrane and the rejected absorbent enriched solution exits the separator unit externally of the membrane.

6. The apparatus as defined in claim 1 wherein the heat exchange means comprises a leg located between the separator unit and the absorber, along which is located an evaporator.

7. The apparatus as defined in claim 6 wherein an expansion device is located along the heat transfer leg prior to the evaporator.

8. The apparatus as defined in claim 6 wherein further heat transfer means are included in the heat transfer leg that do not effect a phase change of the refrigerant.

9. The apparatus as defined in claim 1 wherein an expansion device is located between the membrane separator unit and the absorber.

10. Apparatus for effecting a heat transfer in a particular area comprising:

(a) a pressure differential membrane separator unit, said separator unit including a semi-permeable membrane presented in a flow path of a refrigerant-absorbent solution, said membrane osmotically separating at least a portion of said refrigerant from said solution and rejecting said absorbent, whereby an absorbent enriched solution remains;

(b) a heat transfer leg operatively associated with said membrane separator unit to receive separated refrigerant therefrom and treat said refrigerant to effect a heat exchange in an area;

(c) an absorber operatively associated with said heat transfer leg and said membrane separator unit, said absorber receiving refrigerant and absorbent enriched solution for absorption thereat; and (d) pressure pump means associated with said absorber and said membrane separator unit for transferring said refrigerant-absorbent solution under pressure to said separator unit.

11. The apparatus as defined in claim 10 wherein refrigerant pressure adjusting means are provided along said heat transfer leg to properly adjust the pressure of the refrigerant thereat.

12. The apparatus as defined in claim 10 wherein pressure dissipating means are provided between said separator unit and said adsorber to dissipate the increased pressure of said absorbent enriched solution prior to entry into said absorber.

13. The apparatus as defined in claim 12 wherein said pressure dissipating means is a work unit that is powered by said absorbent enriched solution pressure.

14. The apparatus as defined in claim 10 wherein the heat transfer leg comprises an expansion device to reduce the pressure of said refrigerant, and an evaporator which vaporizes said refrigerant to cool an affected area.

15. The apparatus as defined in claim 14 wherein a compressor is located between said evaporator and said absorber to increase the pressure of refrigerant vapor thereat to a level sufficient for passage into said absorber.

* * * * *